June 6, 1967     D. E. PIERSON ET AL     3,323,172
EXTRUSION APPARATUS
Filed Jan. 22, 1965     3 Sheets-Sheet 1
FIG.\_\_\_1
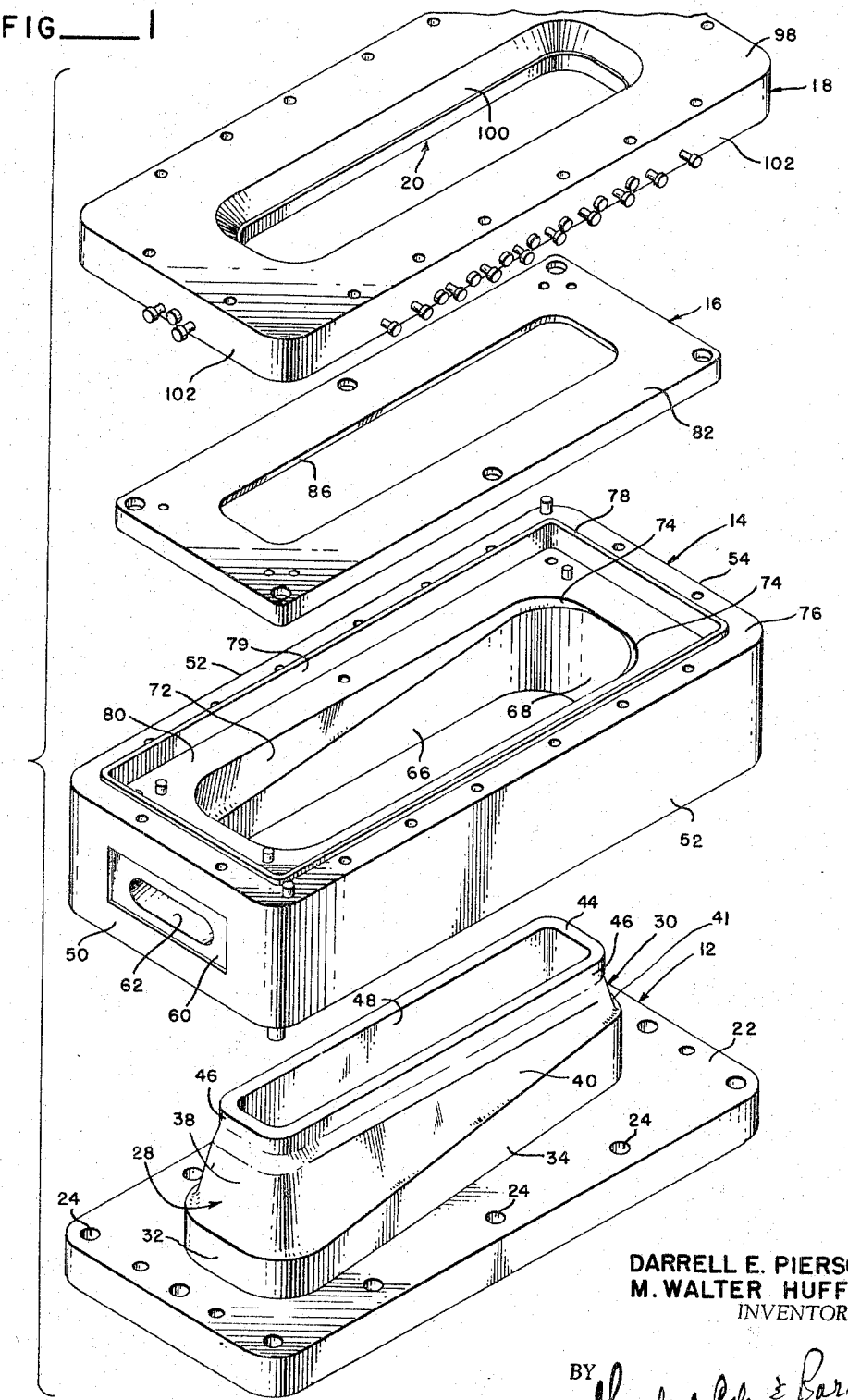
DARRELL E. PIERSON
M. WALTER HUFF
           *INVENTORS*
BY Graybeal, Cole & Barnard
*ATTORNEYS*

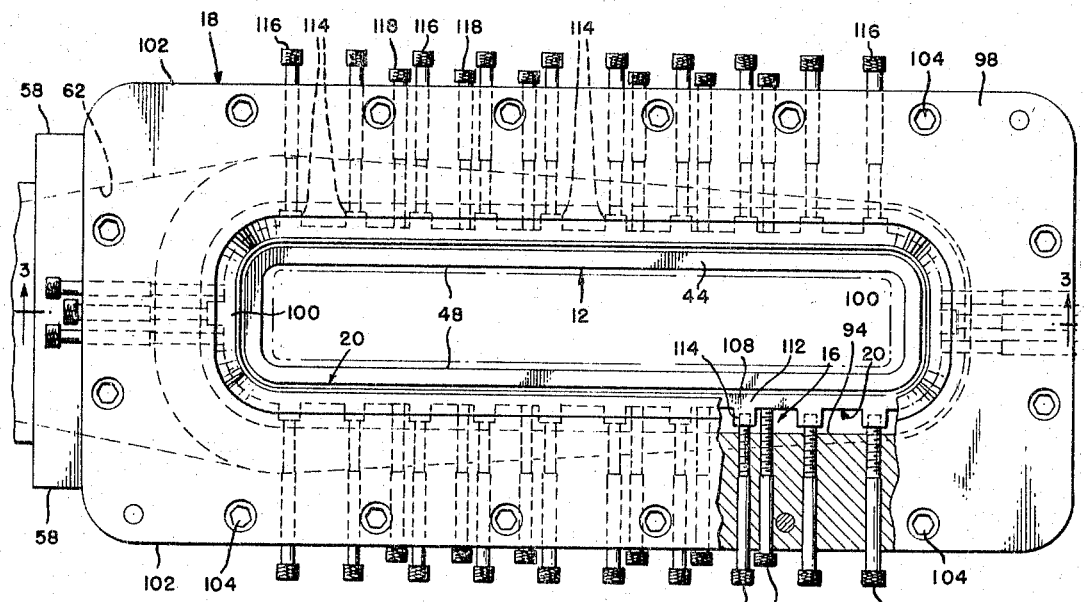
FIG___2
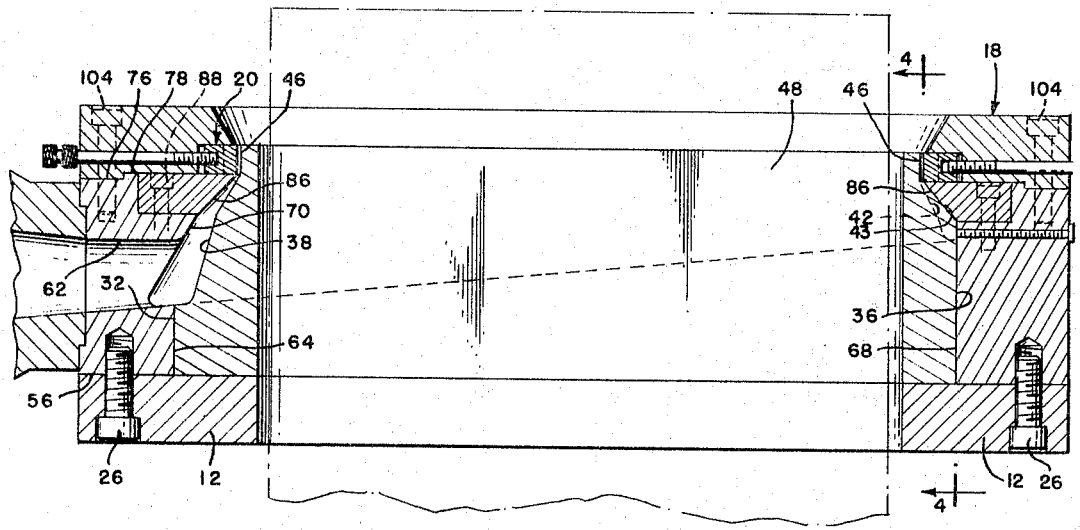
FIG___3
DARRELL E. PIERSON
M. WALTER HUFF
INVENTORS

June 6, 1967 D. E. PIERSON ET AL 3,323,172
EXTRUSION APPARATUS
Filed Jan. 22, 1965 3 Sheets-Sheet 3
FIG.__4
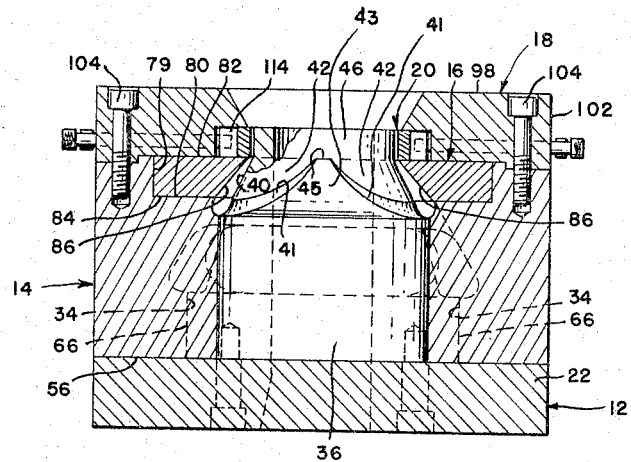
FIG.__5
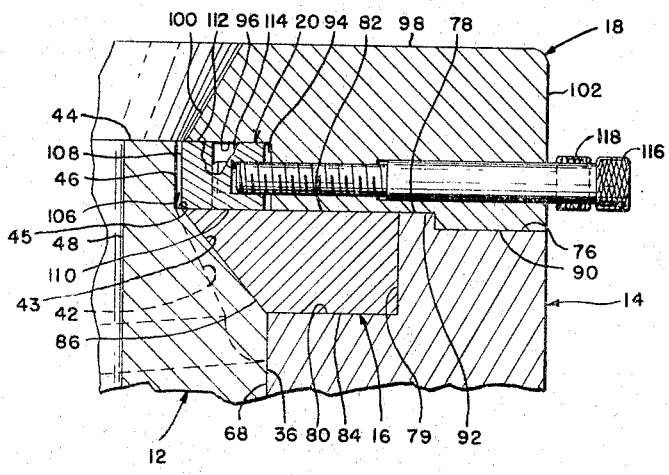
FIG.__6
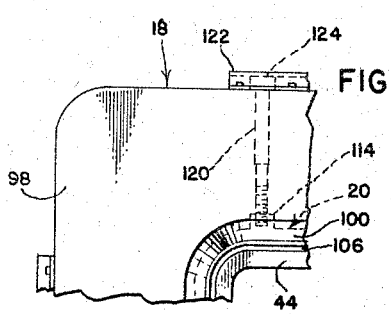
FIG.__7
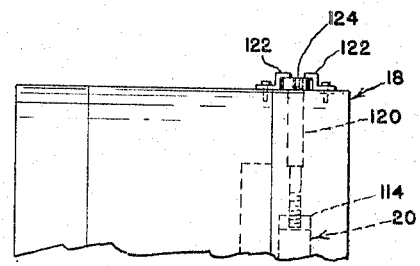
DARRELL E. PIERSON
M. WALTER HUFF
INVENTORS
BY Graybeal, Cole & Barnard
ATTORNEYS

United States Patent Office 3,323,172
Patented June 6, 1967

3,323,172
EXTRUSION APPARATUS
Darrell E. Pierson, Snoqualmie Falls, Wash., and M. Walter Huff, West Vancouver, British Columbia, Canada, assignors to Weyerhaeuser Company, Tacoma, Wash., a corporation of Washington
Filed Jan. 22, 1965, Ser. No. 427,453
6 Claims. (Cl. 18—14)

This invention relates to a new, improved, and novel apparatus for extruding plastic coating onto a substrate moving through said apparatus. More particularly does this invention relate to an extrusion apparatus which allows for precision control of the coating or envelope being extruded onto the substrate so that the thickness of the coating can be closely regulated at any point on the substrate.

Many industries have recognized the value of using plastic coatings. Plastic coatings are desirable from the point of view of giving the object or product increased life, a higher degree of protection, weather-resistance, improved appearance, etc. The list of items to which plastic coatings can be adapted is almost numberless. However, conventional methods of applying coatings, such as by spraying, painting, dipping, and so forth are slow, cumbersome. One of the more significant disadvantages of conventional method of applying plastic coatings resides in the difficulty of controlling the thickness of the coat. While extrusion devices have been devised for successfully extruding heavy walled materials such as plastic pipe and tubing, such devices have been found to be unsuccessful in giving or producing thin coatings in the range of from about several thousandths of an inch to 40 or 50 thousandths.

The obtaining of a controlled, thin-walled extruded envelope or coating for a given substrate is achieved within the die. Since the present invention is primarily concerned with the extrusion coatings for lumber, plywood, particle board, or other composite panels, which with the coatings thereon are to be sold commercially as siding, stadium seats, decking and the like, and also for other applications requiring durability as well as attractiveness, it is necessary that the coating be free of defects. To produce a thin coating of pre-determined thickness which is commercially attractive, it is essential that the plastic material be under control at all times from the point at which it leaves the extruder and enters the die to the point where it leaves the die and is attached to the board. Heretofore known devices have failed to solve this problem of control, particularly where the coating is to be made or extruded from a rigid or semi-rigid vinyl such as polyvinylchloride. The die, in order to extrude an envelope, requires a manifold portion delivering material to the area to the rear of the die lands. To avoid the problem of imperfections, gaps, and tears in the envelope, it is important that an even or uniform distribution and flow of the plastic material be maintained so as to prevent stagnation of the plastic within the manifold. Stagnation can occur at sharp corners or pockets which are out of the line of flow of the plastic, thus creating turbulence or stoppage of flow. Stagnation can also occur at those points where the plastic is allowed to flow too slowly. Hence it will be seen that if residence time of the plastic in the die is increased, the possibility of plastic degradation is enhanced. Furthermore, if the plastic is allowed to slow down at any location within the die, turbulence may be created by undesirable flow characteristics, again with the possibility that the plastic material will be allowed to degrade.

It becomes clear, then, that the material must move through the die at a relatively constant rate of flow. Another reason for wanting to maintain an even or uniform flow or pressure of the material in the manifold is to permit it to enter the forming land section under equal pressure at all points of entry to said land section. Since it is not possible to design the die to present perfectly balanced pressures from one end of the die to the other, it is necessary that the die land section be adjustable to compensate for pressure inconsistencies in the material as it enters the land section.

The present invention overcomes the deficiencies and disadvantages of prior art devices by the utilization of an adjusting plate which, with the die mandrel, forms the die-land section through which the plastic coating is extruded. The adjusting plate is in the form of an elongate ring type plate around the outer edges of which are spaced means for moving a given portion of the adjusting plate either inwardly or outwardly, according to thickness desired in the plastic coating. The adjustment plate is supported behind by the die bushing or an adapter on the die bushing. The face or outer surface of the adjusting plate is contacted by a face plate which with the mandrel and bushing, provide a cavity for the adjusting plate. Sufficient space is allowed the adjusting plate to define the land section with respect to the mandrel and also to permit outward movement of said adjusting plate. Significantly, the novel manifold structure of this extrusion apparatus acts to present as nearly ideally as possible, a uniform material pressure at the entrance to the lands. It is this manifold which permits the adjustment plate to exercise close control over the coating or film thickness.

Accordingly, it is a feature of this invention to provide an extrusion apparatus having a novel combination of elements for extruding thin-walled films and coatings in continuous envelope form.

Another feature of this invention is to provide an extrusion apparatus which exercises precision control and regulation over the thickness of the coating or film extruded therefrom.

Still another feature of this invention is to provide an extrusion apparatus which eliminates degradation and stagnation of the plastic material being extruded therefrom.

Yet another feature of this invention is to provide an extrusion apparatus which is reliable in operation and economical to fabricate, operate, and maintain.

A further feature of this invention is to provide an extrusion apparatus in which the control means for regulating thickness of the extruded film or coating can be adjusted instantly and without the use of shims or the like and in which there is no necessity for dismantling the die in order to accomplish adjustments.

An even further feature of this invention is to provide an extrusion apparatus which, because of its capability for instant adjustment in regulating coating thickness, produces savings by eliminating down time, minimizing labor requirements, and giving a quality product.

A still further feature of this invention is to provide an extrusion apparatus which is easily assembled and disassembled and which permits extruding precisely regulated predetermined thickness at various locations on said coating.

An even further feature of this invention is to provide an extrusion apparatus which is adaptable to extrude coatings on any type of random, intermittent, or continuous length substrate of whatever material.

Yet a further feature of this invention is to provide an extrusion apparatus of novel structural arrangement and design.

Other features and advantages of this invention will become apparent in the following detailed description, taken together with the drawings forming a part of this application, in which:

FIGURE 1 is an exploded disassembled view in perspective showing the principal parts of this invention;

FIGURE 2 is a front elevational view of the assembled extrusion apparatus, with parts broken away to show more clearly the adjustment plate and its location in the structural details of this apparatus;

FIGURE 3 is a plan view in cross section taken along the line 3—3 of FIGURE 2 and further illustrating the structural details of this apparatus;

FIGURE 4 is a side elevational view in cross section, taken along the line 4—4 of FIGURE 3, and further illustrating details of structure and configuration of the extrusion apparatus manifold;

FIGURE 5 is a partial cross-sectional view of the extrusion apparatus showing more clearly and in greater detail features of the adjustment plate and its associated parts;

FIGURE 6 is a partial elevational view showing an alternative single adjustment bolt feature for regulating the adjustment plate; and FIGURE 7 is a partial side elevational view showing the adjustment feature of FIGURE 6.

Referring now to the drawings, in which like parts will have like numbers throughout, it will be seen, particularly with reference to FIGURE 1, that the preferred embodiment of this extrusion apparatus or die is comprised essentially of five basic parts: the die mandrel is generally designated by the number 12; the die bushing, generally designated by the number 14; the die bushing adapter plate, generally designated by the number 16; the die face plate, generally designated by the number 18; and the die adjusting plate, generally designated by the number 20.

Die mandrel 12 has a base plate 22 with the mandrel itself formed preferably integrally therewith. Base plate 22 has a series of bolt holes 24 around the periphery or edges thereof to receive bolts 26 which attach the mandrel to die bushing 14. It will be noted that the mandrel forming section of mandrel 12 has an inner manifold end 28 and outer manifold end 30. Inner manifold end 28 has inner end bushing contact surface 32, side bushing contact surfaces 34, and outer bushing contact surface 36. It will be seen that the bushing contact surfaces 32, 34, and 36 increase gradually and generally lineally from the inner contact surface 32 along the side bushing contact surfaces 34 to the outer end bushing contact surface 36, where a maximum contact relationship with the bushing is established. Above the bushing contact surfaces are the mandrel manifold surfaces beginning with the inner end mandrel surface 38, side manifold surfaces 40, and outer end manifold surfaces 42 (see FIGURE 4). The manifold surfaces 38, 40, and 42 coact in contact relationship with manifold surfaces in die bushing 14 to define the manifold cavity. At the front end of the mandrel section is the mandrel die forming wall 44 completing the inner die element for the complete assembly. A mandrel land surface 46 extends around the outer surface of the mandrel die section 44 and merges with the mandrel manifold surfaces, as best seen in FIGURE 1. A die bore or channel for the article or substrate being coated is defined by interior mandrel walls 48. It will be noted that the illustrated embodiment of this die is for a generally rectangular substrate. The principles of this invention will apply to substrates having a number of configurations, such as for bevel siding and the like.

The die bushing 14 is a heavy-walled rectangular block with a mandrel receiving cavity therein and having extruder end surface 50, outer side surfaces 52, and outer end surface 54. Bushing 14 has a back surface 56 which contacts the mandrel base plate 22. The complete die assembly is attached to the extruder by virtue of an adapter 58 connected to the die bushing at adapter connecting point 60 shown in FIGURE 1. It will be seen that the extruder adapter 58 which supports the die on the extruder is hollow, allowing plastic material to flow from the extruder through the extruder adapter and into the die assembly or apparatus through manifold infeed channel 62. Bushing 14 has as mentioned, a hollow portion or cavity or internal wall in the center thereof for receiving the mandrel section of mandrel 12. Said receiving cavity has a mandrel contact surface 64 at its inner end for contacting surface 32 on the mandrel. The internal wall also has mandrel contacting side surfaces 66 for mating with surfaces 34 on the mandrel, and an outer end mandrel contacting surface 68 for mating with surface 36 on the mandrel.

Above the mandrel contact surfaces on the inside of the bushing are bushing manifold surfaces which coact with the manifold surfaces on the mandrel to define the manifold cavity. A manifold infeed channel 62 opens into the inner end manifold surface of the bushing at inner end manifold surface 70. Similarly, the bushing has side manifold surfaces 72 and outer end manifold surfaces 74. The front face around the outer portion thereof has a face plate surface 76. Surface 76 receives the face plate 18 to be described more fully hereinafter. A ridge or raised portion 78 is offset outwardly to insure that the face plate 18 is retained firmly in position on the bushing. Note that the ridge 78 extends around the entire bushing at the inner edge of face plate surface 76. The bushing is also provided with a centrally disposed bushing adapter recess 80 to receive bushing adapter 16.

The bushing adapter 16 and recess 80 form a practical consideration in the construction of this extrusion apparatus. Ideally, the bushing adapter and the bushing itself could be one piece. However, the machining problems, mostly relating to accuracy of shaping, become monumental. In order to machine the surfaces that are necessary to defining a proper manifold cavity, it was found desirable to make the front section of the bushing in the form of a separate detachable bushing adapter plate 16. Reference to other figures of the drawings will show that bushing adapter 16 is a rectangular plate with a front or adjusting plate surface 82 and a rear or bushing surface 84. Note that an inner manifold surface 86 tapers inwardly from bushing surface 84 of the bushing adapter to the adjusting plate surface 82, and that in fact, said manifold surfaces of the bushing to define a continuous wall. Thus, there is constructed a manifold cavity, which progresses towards the die land section decreasing in size. Adapter 16 is firmly attached to bushing 14 by bolts 88. With the bushing attached to the mandrel, and with the bushing adapter 16 in place, there is defined up to the land surfaces, a manifold cavity wholly surrounding the die bore or channel through which the substrate moves.

Face plate 18, on its back face has a raised portion 90 around the peripheral section which is received on the bushing face plate contact surface 76. An inwardly offset or stepped surface 92 on the back of the face plate contacts ridge 78 on the bushing and continues towards the central opening in the face plate. Surface 92 terminates in spaced relationship to the land surface 46 on the mandrel to define an outwardly directed offset wall 94. It will be noted that surface area 92 of the face plate not only contacts the ridge 78, but also contacts the bushing adapter plate 16 with its front wall surface 82. The face plate surface section 92 terminates generally in line with bushing and mandrel contact surfaces 36 and 68, as well as with side mating surfaces 34 and 66 and inner end mating surfaces 32 and 64, as best seen in FIGURE 5. The offset or stepped wall 94 runs generally parallel to the mandrel land surface 46 and itself terminates generally in line with the front wall 44 of the mandrel. From there a third face plate rear surface section 96 extends towards the die opening in the center. The described configuration in the back side of the face plate 18 in conjunction with the mandrel and bushing adapter 16 defines an adjusting plate cavity to receive adjusting plate 20. The front face 98 of the face plate 18 terminates to define a tapered or beveled wall surface 100 which bevels outwardly from its junction with back surface area 96 to the front face 98. Face plate 18 has side and end surfaces 102. The face plate is securely attached to die bushing 14 with a series of bolts 104.

The adjusting plate, generally shown by the number 20, is located around the land surface 46 of the mandrel and is spaced therefrom in order to define the die cavity 106. The adjusting plate is, in effect, a continuous bar means having a land wall 108 in closely spaced relation to mandrel land surface 46, a rear or adpter bushing contact face 110, and a front or face plate contacting wall 112. At predetermined spaced intervals along the outside surface of the adjusting plate, are raised adjustment bosses 114. Adjustment bosses 114 have opening adjustment bolt 116 threadedly engaged therewith in order to provide means for increasing die cavity 106 by pulling the adjustment plate away from the mandrel land surface 46. A closing adjustment bolt 118 is located in close proximity to the first bolt 116 in order to provide both in-and-out movement of the adjusting plate. The closing adjustment bolt provides means for moving the adjustment plate or bar closer to the mandrel land surface, to narrow or decrease die cavity 106. Together, the adjustment bolts 116 and 118 provide for control of the adjustment bar where it is needed. It will be observed that closing adjustment bolts 118 are not needed in some locations with an opening adjustment bolt 116, since movement may be demanded of the adjustment bar only generally in one direction in a given location. The converse is also true, and in those areas in which it is necessary to provide both in-and-out movement of the adjustment plate, both opening and closing adjustment bolts will be provided.

An alternative and obvious manner of providing for adjustment control is shown in FIGURES 6 and 7. Instead of one bolt or screw means for opening die cavity 106 and a separate bolt for narrowing die cavity 106, a single bolt 120 performs both functions. In order that said bolt can move the adjustment plate either in or out, it is necessary that it be restrained from longitudinal movement by a hold down means 122 engaging bolt head 124. Enough gap is left in the hold down to permit access to head 124 with a turning device such as an Allen wrench.

It will be noted by reference to FIGURE 4 and 5, that the outer end of the manifold is formed to eliminate a stagnation pocket. In effect the manifold is double, being divided into an upper and lower section. Prior attempts have been made by others to eliminate stagnation pockets, particularly at the outer end of the manifold, by installing bleeder valves at a particular location. It has been discovered, however, that the outer end of the manifold can be closed or filled in up to the beginning of the land section in a manner now to be described. It will be noted that the rearmost areas of the manifold cavity where the bushing and mandrel contact surfaces abut or contact is generally curved. As the mandrel manifold surfaces 38, 40, and 42 progress toward the outer end of the apparatus they decrease as described above. As manifold surfaces 40 round the outer ends of the mandrel to form outer manifold surface 42 the generally linear rate of area decrease merges into upwardly curving sweeps or paths 41. The sweeps 41 do not merge but rather terminate at mandrel land wall surface 46 in spaced relation to each other to form a shallow and relatively short offset wall 45. In this a supplemental or bushing adapter contact surface 43 is defined. The bushing adapter contact surface 43 contacts the inner tapered or angled adapter surface 86 and the shallow outer offset wall 45 is substantially in line with the front adapter face or surface 82. In this way the manifold is effectively divided at the outer end. With the sweep surfaces or paths 41 formed as generally shown and described hot plastic material flowing toward the outer end of the apparatus finds no reservoir or pocket out of the line of flow in which to stagnate and degrade. Furthermore, it has been found that the outer end of the manifold can be effectively separated up to the beginning of the land surfaces and that a complete and unbroken envelope of extruded plastic formed. The plastic material flows into the land section forward of offset wall 45 as effectively as if the manifold were continuous at the outer end.

It should be understood that the principle of adjusting plate 20 is not basically a shifting of the entire plate with respect to the mandrel. Rather, adjustment is a matter of applying control to a given section or portion of the plate. Thus, a certain amount of flexing takes place in the adjusting plate as the adjustment bolts are turned. It must be recognized, however, that the tolerances involved allow some side ways shifting of the adjustment plate 20 up to about 20 thousandth of an inch. Likewise, limited side shifting of the adjusting bolts extending through the face plate to the adjustment plate is inherent in the design.

Having illustrated and described a preferred embodiment of the invention, it should be apparent to those skilled in the art that the invention permits modification in arrangement and detail. It is intended to claim as part of the invention all such modifications as come within the true spirit and scope of the appended claims.

What is claimed is:

1. An apparatus for extruding films and coatings, comprising: (a) a mandrel means having a base section and a forming mandrel portion on said base including manifold surfaces; (b) bushing means having a mandrel receiving cavity with manifold surfaces thereon and together with manifold surfaces on said forming mandrel portion, defining a manifold for said apparatus; (c) a face plate means for attachment to said bushing means having a centrally located mandrel receiving cavity which, together with said bushing means and said forming mandrel portion, define an adjusting plate cavity; and (d) an endless, flexible adjustment plate means in said adjustment plate cavity surrounding said forming mandrel portion to form a continuous die land cavity, said adjustment plate means having control means thereon for moving predetermined portions of said adjustment plate means with respect to said forming mandrel portion.

2. An apparatus for extruding films and coatings, comprising: (a) a mandrel means having a base section and a forming mandrel portion on said base including manifold surfaces; (b) bushing means having a mandrel receiving cavity with manifold surfaces thereon and together with manifold surfaces on said forming mandrel portion, defining a manifold for said apparatus; (c) a face plate means for attachment to said bushing means having a centrally located mandrel receiving cavity which, together with said bushing means and said forming mandrel portion, define an adjusting plate cavity extending around and in spaced relation to said forming mandrel portion; and (d) an endless, flexible adjustment plate means in said adjustment plate cavity surrounding said forming mandrel portion to form a continuous die land cavity therewith, said adjustment plate means having a plurality of control means thereon for moving a predetermined sectional length of said adjustment plate means with respect to said forming mandrel portion, said control means being connected to said bushing means to assist in moving said adjustment plate.

3. An apparatus for extruding film and coatings, comprising: (a) a mandrel means having a base section and a forming mandrel portion on said base including manifold surfaces; (b) a bushing means having a mandrel receiving cavity with manifold surfaces thereon; (c) a bushing adapter plate means having a hollow central mandrel receiving cavity and a manifold surface which, in conjunction with manifold surfaces in said bushing together with manifold surfaces on said forming mandrel portion, define a manifold for said apparatus; (d) a face plate means for attachment to said bushing having a centrally located mandrel receiving cavity which, together with said bushing means and said bushing adapter plate means defines an endless adjusting plate cavity surrounding said forming mandrel portion; and (e) an endless, flexible adjustment plate means in said adjustment plate cavity surrounding said forming mandrel portion to form a continuous die and cavity, said adjustment plate means having control means thereon for moving predetermined portions of said adjustment plate means with respect to said forming mandrel portion.

4. An apparatus for extruding films and coatings, comprising: (a) a mandrel means having a base section and a forming mandrel portion on said base including bushing contact surfaces and manifold surfaces; (b) a bushing means having a mandrel receiving cavity, said cavity including mandrel contact surfaces and manifold surfaces; (c) a bushing adapter plate means having a central mandrel receiving cavity and manifold surfaces which, in conjunction with manifold surfaces in said bushing together with manifold surfaces on said forming mandrel portion, define a manifold for said apparatus; (d) a face plate means for atachment to said bushing having a centrally located mandrel receiving cavity which, together with said bushing means, said bushing adapter plate means, and said forming mandrel portion, define an adjusting plate cavity; and (e) a limitedly flexible ring type adjustment plate means in said adjustment plate cavity surrounding said forming mandrel portion to form continuous die land cavity, said adjustment plate means having control means thereon for moving a predetermined sectional length of said adjustment plate means with respect to said forming mandrel portion.

5. An apparatus for extruding films and coatings, comprising: (a) a mandrel means having a base section and a forming mandrel portion on said base including manifold surfaces; (b) a bushing means, having a mandrel receiving cavity with manifold surfaces thereon; (c) a bushing adapter plate means having a central mandrel receiving cavity and a manifold surface which, in conjunction with manifold surfaces in said bushing together with manifold surfaces on said forming mandrel portion, define a manifold for said apparatus; (d) face plate means for attachment to said bushing having a centrally located mandrel receiving cavity which, together with said bushing means, said bushing adapter plate means, and said forming mandrel portion, define an adjusting plate cavity; and (e) an endless, flexible adjustment plate means in said adjustment plate cavity surrounding said forming mandrel portion to form a continuous die land cavity, said adjustment plate means having a plurality of spaced apart control means thereon for moving a predetermined sectional length of said adjustment plate means with respect to said forming mandrel portion to increase and decrease said die cavity at given locations.

6. An apparatus for extruding films and coating, having an infeed end and an outer end comprising: (a) a forming mandrel portion including manifold surfaces; (b) bushing means having a mandrel receiving cavity with manifold surfaces thereon and together with manifold surfaces on said forming mandrel portion defining a manifold for said apparatus; (c) a face plate means for attachment to said bushing means having a centrally located mandrel receiving cavity which, together with said bushing means and said forming mandrel portion, define an adjusting plate cavity; (d) an endless, flexible adjustment plate means in said adjustment plate cavity surrounding said forming mandrel portion to form a continuous die land cavity, said adjustment plate means having control means thereon for moving said adjustment plate means with respect to said forming mandrel portion; and (e) manifold separation means at said outer end comprising a raised wall portion on said forming mandrel portion in contact with said bushing terminating at the entrance to said die land cavity, and defining curved sweep surface means on each side thereof for directing flow of plastic material to the outermost portion of said die land cavity.

References Cited
UNITED STATES PATENTS

| | | | |
|---|---|---|---|
| 441,808 | 12/1890 | Royle | 18—13 |
| 2,025,666 | 12/1935 | Hanff. | |
| 2,427,930 | 9/1947 | Suttner | 18—13 |
| 2,560,778 | 2/1953 | Richardson et al. | 18—13 |
| 2,628,386 | 2/1953 | Tornberg | 18—12 |
| 3,080,608 | 3/1963 | Van Riper | 18—12 |

FOREIGN PATENTS

| | | |
|---|---|---|
| 892,302 | 3/1962 | Great Britain. |

WILLIAM J. STEPHENSON, *Primary Examiner.*